(12) United States Patent
Clemm et al.

(10) Patent No.: US 8,850,324 B2
(45) Date of Patent: Sep. 30, 2014

(54) VISUALIZATION OF CHANGES AND TRENDS OVER TIME IN PERFORMANCE DATA OVER A NETWORK PATH

(75) Inventors: Alexander Clemm, Los Gatos, CA (US); Eric Dorman, Newark, CA (US); Steve Chen-Lin Chang, Cupertino, CA (US); Gaurang Mokashi, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 864 days.

(21) Appl. No.: 13/019,848

(22) Filed: Feb. 2, 2011

(65) Prior Publication Data

US 2012/0198346 A1    Aug. 2, 2012

(51) Int. Cl.
G06F 3/048 (2013.01)
H04L 12/26 (2006.01)
H04L 12/24 (2006.01)

(52) U.S. Cl.
CPC ............. H04L 43/0817 (2013.01); H04L 41/22 (2013.01); H04L 43/0829 (2013.01)
USPC .......................................... 715/736; 715/853

(58) Field of Classification Search
CPC ............................... G06F 3/048; G06T 11/206
USPC .................................. 715/736, 853
See application file for complete search history.

(56) References Cited

U.S. PATENT DOCUMENTS

| 5,845,277 | A  | * | 12/1998 | Pfeil et al. ............................ 1/1 |
| 6,356,256 | B1 | * | 3/2002  | Leftwich ....................... 345/157 |
| 6,654,803 | B1 | * | 11/2003 | Rochford et al. ............. 709/224 |
| 2011/0098540 | A1 | * | 4/2011 | Tanishima et al. ............ 600/300 |
| 2012/0110460 | A1 | * | 5/2012 | Wilson .......................... 715/736 |
| 2012/0151419 | A1 | * | 6/2012 | Kent et al. ..................... 715/854 |

* cited by examiner

*Primary Examiner* — Boris Pesin
*Assistant Examiner* — Matthew Ell
(74) *Attorney, Agent, or Firm* — Patterson + Sheridan, LLP

(57) ABSTRACT

A system and technique for visualizing changes and trends in performance data over a network path are disclosed. More specifically, a network management system generates and displays an object that represents data for one or more performance characteristics related to a plurality of network nodes in the network path. The object is dynamically updated to include updated data related to the one or more performance characteristics. In one embodiment, a representation of the updated data is superimposed over representations of previously collected data relating to the performance characteristics. The transparency of the representations associated with the previously collected data may reflect a difference in time between the current time and the time at which the data was collected. In another embodiment, a timeline is included in the object that tracks the state of the object at one or more previous points in time.

15 Claims, 10 Drawing Sheets

VISUALIZATION OF CHANGES AND TRENDS OVER TIME IN PERFORMANCE DATA OVER A NETWORK PATH

BACKGROUND OF THE INVENTION

1. Field of the Invention

The invention relates generally to the field of network management and, more specifically, to visualization of changes and trends over time in performance data over a network path.

2. Description of the Related Art

Traditional network management systems allow a network administrator to troubleshoot network problems using a graphical user interface (GUI). In some instances, the GUIs may include such features as a topology view of the network, a view of a network path taken by a particular service, and a view of network statistics for a particular node in the network. The topology view of the network may include a layout of all nodes and the particular IP address for each particular node. The view of a network path taken by packets associated with a particular service may be displayed by highlighting each node in the network path in the topology view. The view of network statistics for a particular node may be displayed when a network administrator zooms in on a particular node in the topology view by selecting that node.

Utilizing such network management systems, the network administrator may check network statistics for each node individually in order to troubleshoot any issues with the network. The GUI may display network statistics, such as a CPU utilization rate, memory utilization rate and link utilization rate, for a particular node in a single view. Furthermore, the GUI may track a particular network statistic over time by plotting that network statistic on a graph where the x-axis is associated with time and the value of the network statistic is tracked on the y-axis.

What is needed in the art is an improved approach for visualizing performance data for multiple nodes of a network path in a common view.

BRIEF DESCRIPTION OF THE FIGURES

For clarity, identical reference numbers have been used, where applicable, to designate identical elements that are common between figures. It is contemplated that features of any of the example embodiments may be incorporated in other embodiments without further recitation.

DESCRIPTION OF EXAMPLE EMBODIMENTS

In the following description, numerous specific details are set forth to provide a more thorough understanding of various embodiments of the invention. However, it will be apparent to one of skill in the art that certain embodiments of the invention may be practiced without one or more of these specific details. In other instances, well-known features have not been described in order to avoid obscuring the invention.

Overview

One embodiment of the present invention sets forth a method for visualizing changes or trends in one or more performance characteristics over a network path. The method steps include receiving data associated with one or more performance characteristics related to a plurality of network nodes in a network path, generating an object within a GUI to display a first data associated with at least one performance characteristic via a first representation within the object, the first data being received at a first time, and updating the object to display a second data associated with the at least one performance characteristic via a second representation within the object, the second data being received at a second time.

DETAILED DESCRIPTION OF THE FIGURES

Figure 1:
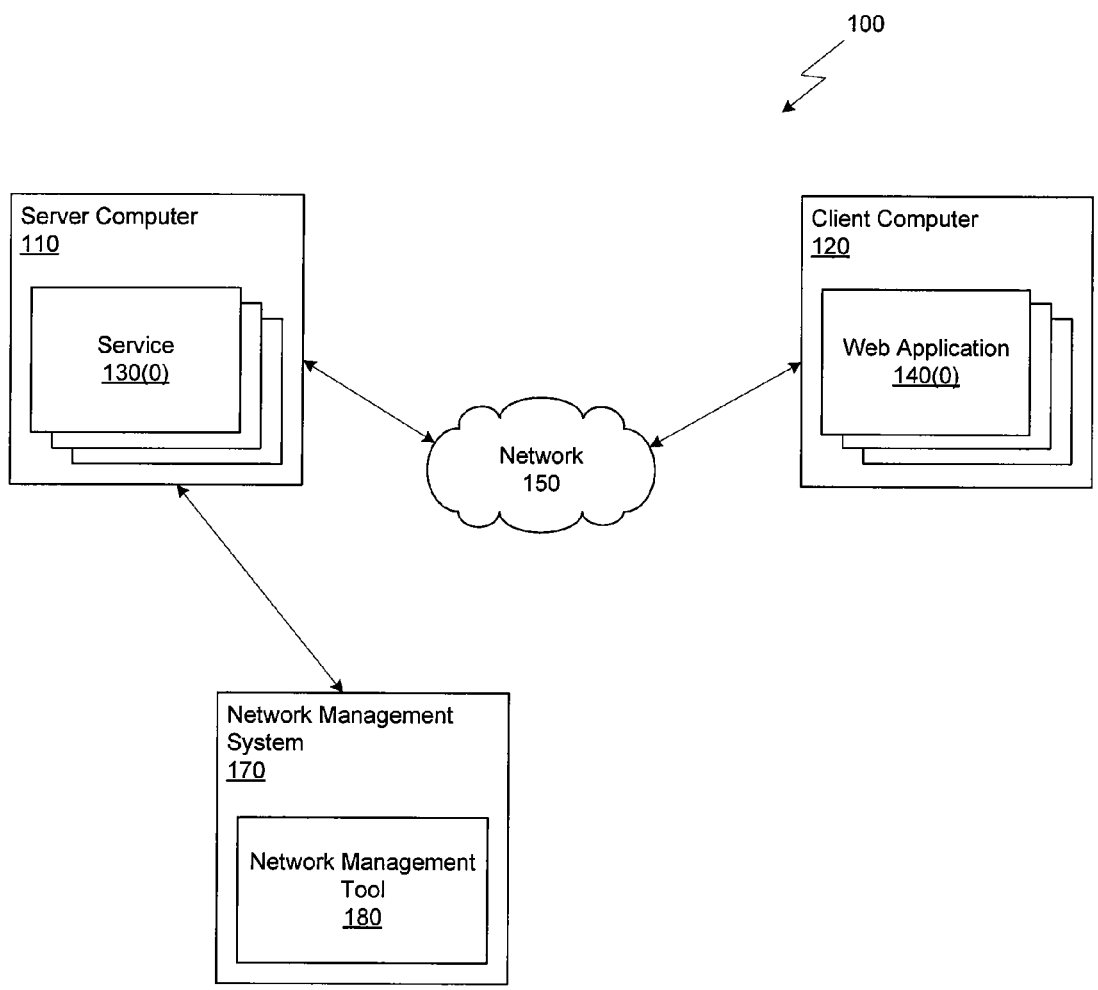
FIG. 1 illustrates a computer network monitored by a network management system, according to one example embodiment of the present invention.

FIG. 1 illustrates a computer network 100 monitored by a network management system 170, according to one example embodiment of the present invention. As shown, computer network 100 includes a server computer 110, a client computer 120, a network management system 170, and a network 150. Network 150 may be a local area network (LAN), a wide area network (WAN), or the Internet. Alternatively, network 150 may be a combination of multiple networks, such as a LAN with an interface connected to the Internet. Server computer 110 includes one or more services 130 such as a media streaming service, and client computer 120 includes one or more web applications 140 that may be configured to call services 130. Server computer 110 and client computer 120 transmit communications via an interface to network 150.

Network management system 170 may be a computer running a network management tool 180 configured to visualize performance characteristic data for a plurality of network nodes of computer network 100. For example, network management tool 180 may be configured to display performance characteristic data for all network nodes included in a network path. A network path may include all nodes in network 150 traversed by a particular network flow, such as streaming media packets transmitted between services 130 and web applications 140, as well as server computer 110 and client computer 120. In one embodiment, network management system 170 may be connected directly to server computer 110. In other embodiments, network management system 170 may be connected to network 150. It will be appreciated by one of ordinary skill in the art that one or more of server computer 110, client computer 120 and network management system 170 may be included in network 150.

Network traffic for services 130 flows between server computer 110 and client computer 120 over a plurality of network nodes in network 150. As issues arise with the network 150, users of web applications 140 may experience interruptions. For example, certain network nodes in network 150 may experience high loads of network traffic that cause delays in delivery of data packets between services 130 and web applications 140. For bandwidth critical services such as media streaming or voice over IP (VOIP), these delays can cause the resulting application to fail or cause the service level and performance of the application to degrade. Thus, a network administrator may need to diagnose which network nodes in the network path are causing the problem in order to correct the issue.

Figure 2:
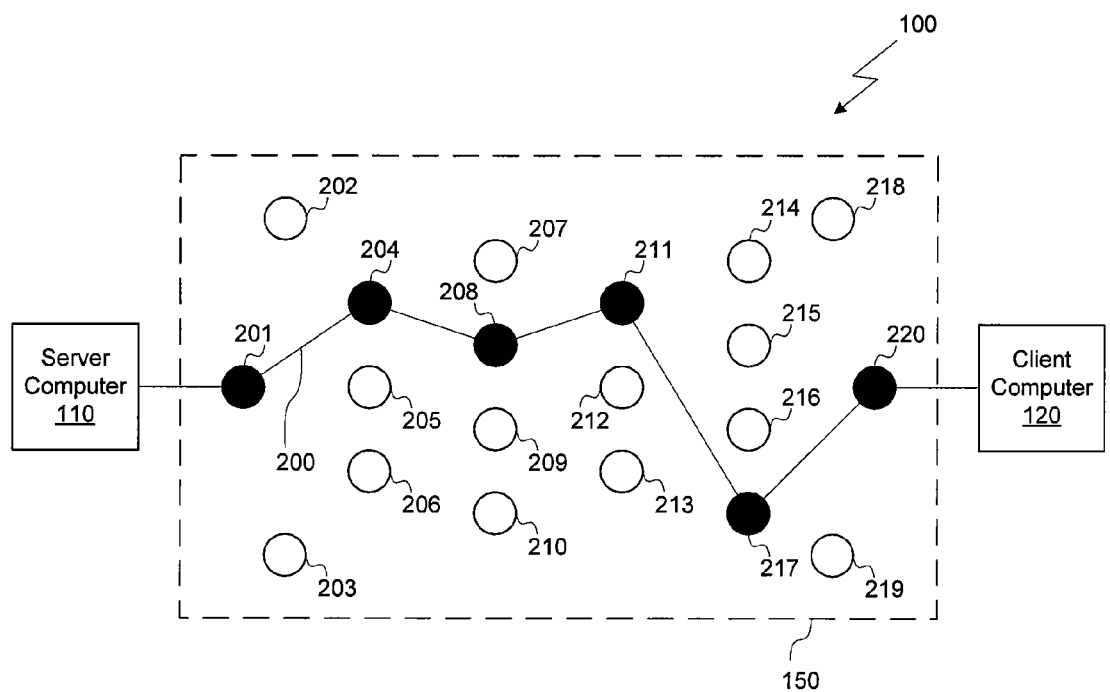
FIG. 2 illustrates a network path in the computer network of FIG. 1, according to one example embodiment of the present invention.

FIG. 2 illustrates a network path 200 in the computer network 100 of FIG. 1 according to one example embodiment of the present invention. As shown, network 150 includes network nodes 201 through 220. Each of the network nodes 201-220 may be a different network device such as a modem, a bridge, a switch, a VOIP handset, a computer or other networking device connected to network 150. For example, network node 201 may be a switch while network node 205 may be a computer connected to network 150. Each network node in network 150 is associated with a unique MAC address. In one embodiment, network 150 is the Internet and each network node may be identified by a unique IP address.

Network path 200 is the path through the network 150 for packets associated with a particular data stream sent from services 130 to web applications 140. As shown, network path 200 begins at server computer 110 and ends at client computer 120. Server computer 110 formats data packets for transmission over network 150 and transmits the data packets using a physical layer device such as a NIC. Data packets in network path 200 are forwarded to client computer 120 by network nodes 201, 204, 208, 211, 217 and 220.

In order for a network administrator to troubleshoot issues with computer network 100, network management tool 180 may enable the network administrator to visualize various performance characteristics for the network nodes in network path 200. For example, network management tool 180 may plot the values for a particular performance characteristic on an X-Y graph for each node in network path 200. The x-axis may be configured to represent network path 200, and the y-axis may be configured to represent the value for the particular performance characteristic for each network node in network path 200. In order to facilitate troubleshooting of computer network 100, network management system 170 is configured to collect performance characteristic data from each of the network nodes in network path 200 and display one or more of the performance characteristics for each of the network nodes in a single view on the display.

In one embodiment, network management tool 180 may be configured to cause server computer 110 to collect a plurality of performance characteristics for each of the network nodes in network path 200 by sending a network control message to client computer 120. Server computer 110 may be configured to format the network control message using one or more network management protocols such as the resource reservation protocol (RSVP) or other network management protocol configured to collect performance characteristic data from each of the network nodes. Server computer 110 may send an RSVP message configured to collect data for the performance characteristics of each node along network path 200. Such data may include information about each network node's CPU utilization rate, memory utilization rate, or number of dropped data packets, among other performance characteristics. Such information may pertain to a network node as a whole or to a particular interface included within a network node, such as dropped data packets at an ingress or egress interface for the network node. As the RSVP message is received at each network node along network path 200, the network node may be configured to read the message and append any requested performance characteristic data to the payload of the message before forwarding the RSVP message to the client computer 120. When the RSVP message is received by the client computer 120, the client computer transmits the RSVP message, including the appended performance characteristic data, back to server computer 110 along network path 200. In some embodiments, server computer 110 and client computer 120 may be configured to append requested performance characteristic data to the RSVP message as well. Thus, the collected performance characteristics may include data associated with each of the network nodes in network path 200 as well as the server computer 110 and client computer 120.

In alternative embodiments, network management tool 180 may be configured to cause server computer 110 to collect other data in addition to or in lieu of the performance characteristic data for each of the network nodes in network path 200. Such other data may be any type of data associated with or related to each of the network nodes. Then, network management tool 180 may be configured to display the other data for all network nodes included in the network path.

In one embodiment, each network node of network path 200 is configured to monitor the performance characteristics of that particular network node. The network nodes of network 150 may implement an application layer that continuously monitors various performance characteristics of the network node, such as CPU utilization rate, memory utilization rate, or number of dropped data packets. When the network node receives a network control message requesting performance characteristic data, the application layer is configured to append the requested data to the network control message before forwarding the message to the destination address.

In other embodiments, some network nodes in network 150 may not be configured to monitor their performance characteristics. In such embodiments, when a network control message is received by the network node, the network node simply forwards the message to the destination node without appending any performance characteristic data. However, the network node may update an IP TTL (time to live) counter in the network control message thereby indicating that the network control message traversed through a node. Thus, the server computer 110 receives the returned network control message containing performance characteristic data for the network nodes in network path 200 configured to monitor their performance characteristics and a count of the total number of nodes included in the network path.

It will be appreciated by one of ordinary skill in the art that network management tool 180 may discover network path 200 and collect performance characteristic data of the various network nodes in network path 200 in a variety of ways. For example, network management tool 180 may cause server computer 110 to execute software, such as ICMP traceroute, to discover an IP address for each of the plurality of network nodes in network path 200. Then, network management tool 180 may send separate request messages to each network node in network path 200 to collect performance characteristic data from each of the network nodes individually. Any technically feasible method of collecting performance characteristic data from each of the network nodes in network path 200 is within the scope of the present invention. For example, collecting performance characteristic data could be performed using a simple network management protocol (SNMP), XML messages, or analyzing the flow of data in network 150.

Figure 3:
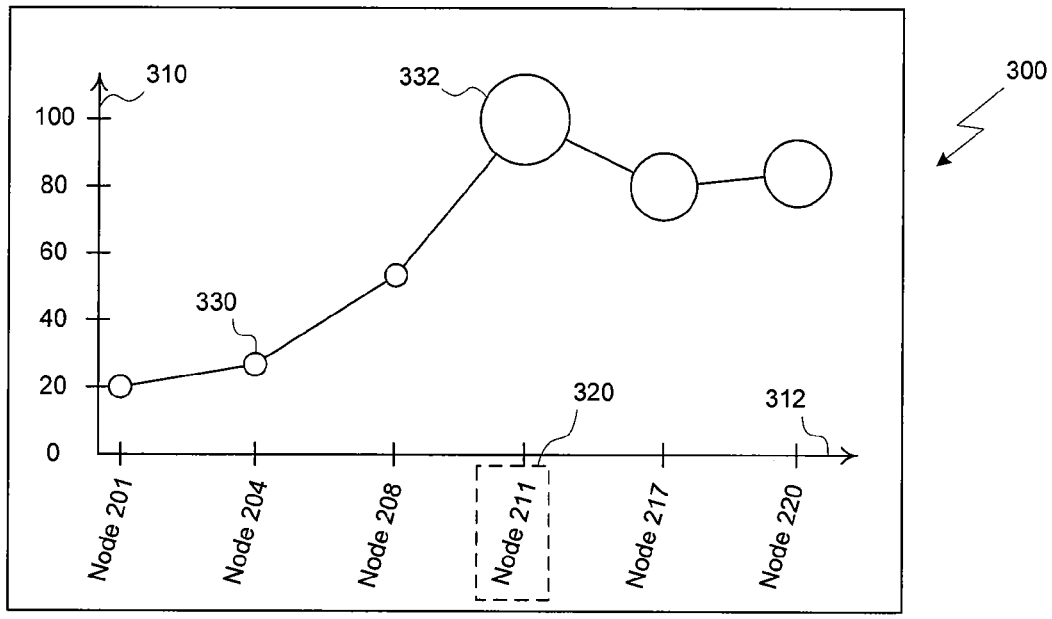
FIG. 3 illustrates a GUI object generated by a network management tool, according to one example embodiment of the present invention.

FIG. 3 illustrates a GUI object 300 generated by a network management tool 180, according to one example embodiment of the present invention. As shown, GUI object 300 is a graph that represents the values of one or more performance characteristics associated with each of the network nodes in network path 200. The x-axis 312 is associated with the network nodes of network path 200, and the y-axis 310 is associated with at least one performance characteristic. In one embodiment, the x-axis 312 includes network node labels 320 that identify the particular network node associated with the data point located above that position on the x-axis. In one embodiment, the network node may be identified by displaying a network node ID, a hop number, or an IP address associated with that particular network node. In another embodiment, any other type of label, such as an icon, may be used to identify each of the network nodes in network path 200. In other embodiments, GUI object 300 may be a different type of graphical representation, such as a histogram or a pie chart.

In one embodiment, a first set of data related to a first performance characteristic is displayed in GUI object 300. The first set of data may correspond to any single performance characteristic collected for each of the network nodes in network path 200. For example, network management tool 180 may collect performance characteristic data for CPU utilization rate from each of the network nodes, and a data point associated with each network node is plotted against the y-axis 310. The location of data point 330 on the y-axis 310 represents the CPU utilization rate of network node 204, shown in FIG. 3 as approximately 25%. In contrast, the location of data point 332 indicates that network node 211 has a CPU utilization rate of approximately 100%.

Advantageously, GUI object 300 may present a second set of data to a network administrator in the same view. In one embodiment, the second set of data corresponds to a characterization of the first set of data according to one or more predetermined threshold values. The size of the data points associated with each network node may be adjusted to indicate the characterization of the value of the performance characteristic for each network node. For example, network management tool 180 may be configured to increase the size of the data point for any network nodes that return a value above a critical threshold. The size of the data point may indicate to the network administrator that a network node is experiencing a critical issue. As shown in FIG. 3, network node 211 has a CPU utilization rate of 100%, and the size of data point 332 is larger to draw the network administrator's attention to network node 211 as the possible cause of the issue. In another embodiment, a plurality of threshold levels may be compared to the first set of data and a plurality of different sized data points may correspond to the plurality of threshold levels.

Figure 4:
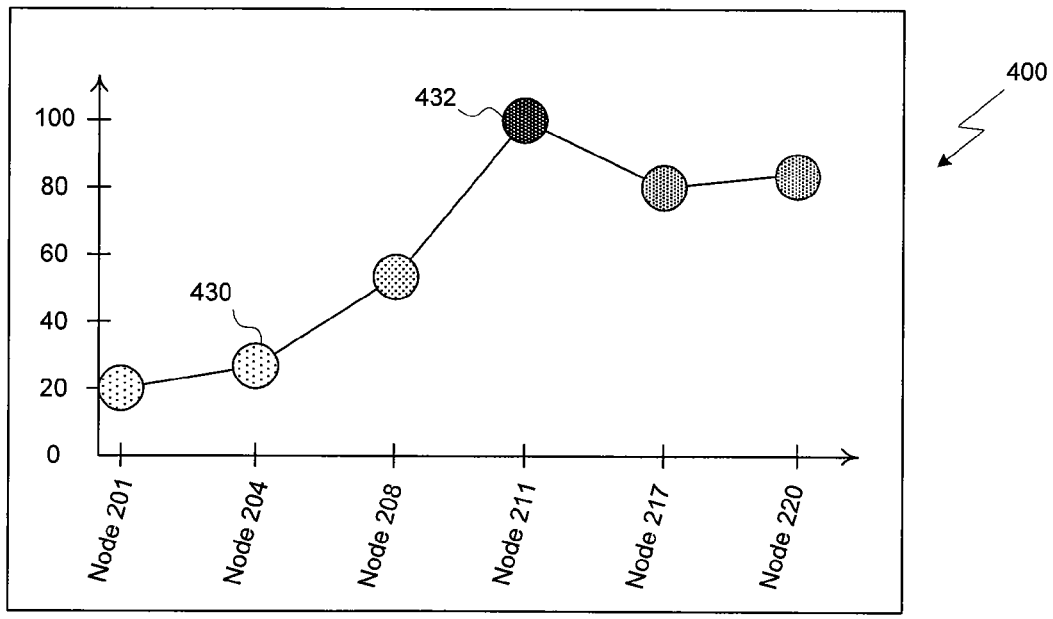
FIG. 4 illustrates a GUI object generated by a network management tool, according to another example embodiment of the present invention.

FIG. 4 illustrates a GUI object 400 generated by a network management tool 180, according to another example embodiment of the present invention. GUI object 400 is similar to GUI object 300 except that the colors of the data points are changed to correspond to a characterization of the first set of data. As shown, data point 410 is a first color, such as green, and data point 412 is a second color, such as red. Network management tool 180 may be configured to display a data point in the first color when the value of the performance characteristic received from the network node is below a critical threshold, indicating that the network node is operating normally. In contrast, network management tool 180 may also be configured to display a data point in a second color when the value of the performance characteristic received from the network node is above a critical threshold, indicating that the network node is operating in a critical state. It will be apparent to one of ordinary skill in the art that more than two colors may be used to indicate varying levels of operation. For example, a third color such as yellow may indicate that the network node is operating just below the critical threshold.

In one embodiment, multiple colors could also be used concurrently, for instance to indicate values for more than two sets of performance characteristics. For example, the colors of the data points could be animated to "cycle through" different colors, each color associated with a different performance characteristic and the intensity of the color corresponding to the value associated with that performance characteristic for a particular network node. In alternative embodiments, the data points for the network node may be divided into multiple parts, where each part corresponds to a different performance characteristic. For example, data points could have a left half associated with the color green and a right half associated with the color blue, with the intensity of the two colors corresponding to the values associated with a particular performance characteristic for that particular network node.

It will be appreciated by one of ordinary skill in the art that different performance characteristics may be represented by changing the data points associated with the network nodes in other ways as well. In one embodiment, the shape of the data points may be changed to reflect the values related to a particular performance characteristic. For example, a circular data point may be used to indicate network nodes operating within a normal range for a particular performance characteristic while a square data point may be used to indicate network nodes operating within a critical range for a particular performance characteristic.

Figure 5:
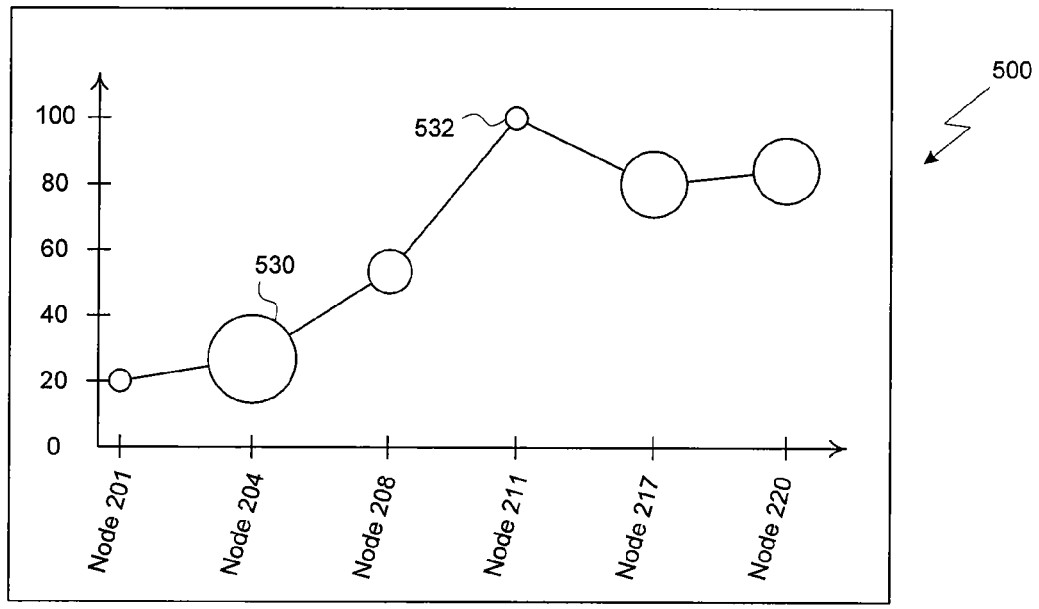
FIG. 5 illustrates a GUI object generated by a network management tool, according to yet another example embodiment of the present invention.

FIG. 5 illustrates a GUI object 500 generated by a network management tool 180, according to yet another example embodiment of the present invention. Unlike GUI objects 300 or 400, GUI object 500 displays two sets of performance characteristic data simultaneously in the same view. As shown, the location of each data point in GUI object 500 in relation to the y-axis 310 indicates the value corresponding to a particular network node for a first performance characteristic. In addition, the size of each data point in GUI object 500 indicates the value corresponding to a particular network node for a second performance characteristic. The size of the data points may be unrelated to the first set of data and, therefore, enables the network administrator to visualize more information in the same view of the display.

In one embodiment, the first set of data may be associated with the CPU utilization rate for each of the network nodes in network path 200, and the second set of data may be associated with a measure of the number of dropped packets for each of the network nodes. For example, data point 530 corresponds to network node 204. The location of data point 530 in relation to the y-axis 310 indicates that the CPU utilization rate of network node 204 is approximately 25%. A CPU utilization rate of 25% may be a normal operating state of the network node, however, the size of data point 530 is relatively large to indicate that a large number of packets received by network node 204 are being dropped by network node 204. In comparison, data point 532 indicates that the CPU utilization rate of network node 211 is approximately 100%, but only a small number of packets received by network node 211 are being dropped by network node 211.

As shown by FIG. 5, the network administrator can easily compare multiple sets of performance characteristic data for each of the network nodes in network path 200 simultaneously in the same view displayed by network management system 170. More than two sets of performance characteristic data may be displayed in GUI object 500 by displaying the data points via another type of representation, such as by including different colored data points as well as different sized data points. In addition, a second set of data points may be plotted on the same graph to display more information simultaneously, where the second set of data points have a different color (or a different shape or other distinguishing characteristic) than the first set of data points to differentiate the data points of the first set from the second set. This may be advantageous for displaying performance characteristics associated with ingress and egress interfaces concurrently (e.g., one set of data points may be associated with ingress interface packet drop rate and CPU utilization, while a second set of data points may be associated with egress interface packet drop rate and CPU utilization). Furthermore, two or more GUI objects 500 may be displayed on the same view in order to show multiple sets of performance characteristics. For example, one view of the display may show four graphs associated with data related to four distinct performance characteristics and the characterization of that data.

Figure 6:
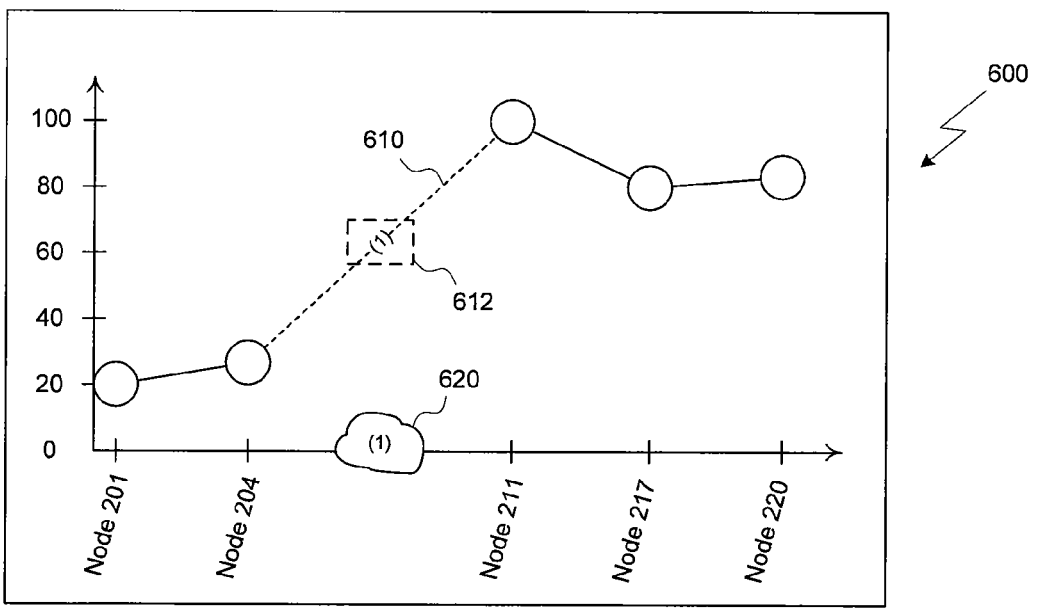
FIG. 6 illustrates a GUI object generated by a network management tool, according to still another example embodiment of the present invention.

FIG. 6 illustrates a GUI object 600 generated by a network management tool 180, according to still another example embodiment of the present invention. In computer network 100, some network nodes may not be configured to monitor the performance characteristics requested by network management tool 180. For example, a switch may not include an application layer that continuously collects performance characteristic data, or the switch may not implement a transport layer configured to process RSVP packets. Such network nodes may be configured to merely forward the network control message to the next network node in network path 200. Thus, network management tool 180 is not able to collect data for the performance characteristic for every network node in network path 200.

In one embodiment, GUI object 600 may be configured to indicate that one or more network nodes are not included in the graph displayed by network management system 170. The line drawn between two data points may be dashed to indicate that one or more network nodes between the two network nodes associated with the data points connected by the line failed to return the requested performance characteristic data. As shown, the line 610 drawn between the data points associated with network node 204 and network node 211 is dashed to indicate that node 208 is not configured to monitor performance characteristics of the network node. In alternative embodiments, the line may be grayed out or an icon such as a cloud may be superimposed over the line to indicate that one or more network nodes failed to return the requested performance characteristic data.

Line 610 may also include a label 612 that indicates the number of network nodes that are not configured to monitor performance characteristics between network node 204 and network node 211. In this case, label 612 shows a value of one to indicate that network node 208 is the only network node that was not configured to monitor performance characteristics. In other cases, label 612 may show a value of two or more to indicate the consecutive number of network nodes that are not configured to collect performance characteristic data. In alternative embodiments, line 610 may not include a label 612. In such embodiments, other methods may be used to indicate the number of intermediate network nodes that failed to return performance characteristic data, such as by varying the size of an icon superimposed over line 610.

In alternative embodiments, the presence of network nodes not configured to monitor performance characteristics may be indicated in other ways, such as by a graphical icon in GUI object 600. For example, icon 620 may be displayed on the x-axis between the labels for network node 204 and network node 211. As shown, icon 620 is a cloud with a label that indicates the number of network nodes that were not configured to monitor performance characteristics between the two network nodes on either side of icon 620.

Figure 7:
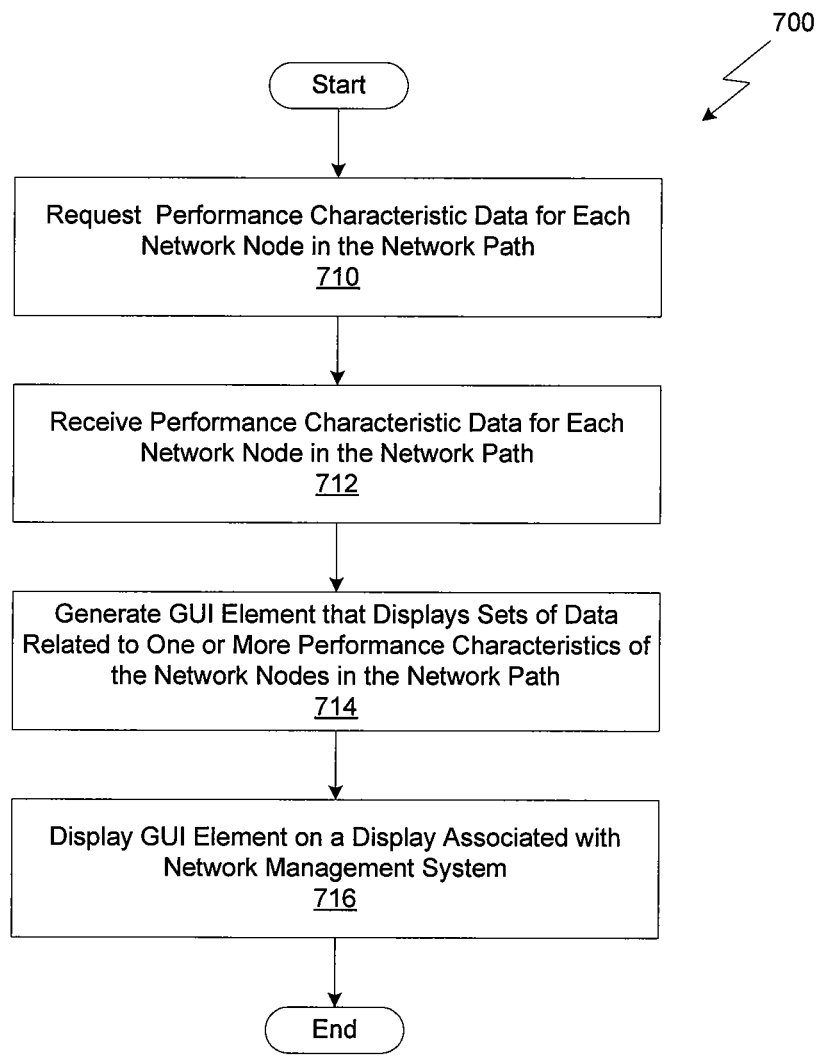
FIG. 7 is a flow diagram of method steps for displaying data for one or more performance characteristics of the network nodes in a network path, according to one example embodiment of the present invention.

FIG. 7 is a flow diagram of method steps 700 for displaying data for one or more performance characteristics of the network nodes in a network path 200, according to one example embodiment of the present invention. Although the method steps are described in conjunction with the systems of FIGS. 1-6, persons skilled in the art will understand that any system configured to perform the method steps, in any order, is within the scope of the present invention.

At step 710, network management tool 180 is configured to request performance characteristic data from one or more network nodes in network path 200. In one embodiment, network management tool 180 causes server computer 110 to send a network control message, such as an RSVP message, to client computer 120 to request the performance characteristic data. In other embodiments, network management tool 180 may retrieve performance characteristic data from the network nodes in network path 200 in any technically feasible manner, such as by polling each network node individually or sending an SNMP message. At step 712, network management tool 180 receives the performance characteristic data in the returned network control message. At step 714, network management tool 180 generates a GUI object 300 associated with the performance characteristic data. In one embodiment, a first set of data represents one set of values for a particular performance characteristic and the second set of data represents a characterization of the first set of data generated by network management tool 180. In another embodiment, a first set of data represents one set of values for a particular performance characteristic and a second set of data represents a second set of values for a second performance characteristic. In yet other embodiments, more than two sets of data representing values for more than two performance characteristics are displayed in GUI object 300. At step 716, network management tool 180 causes the GUI object 300 to be displayed in a display associated with network management system 170.

Figure 8A:
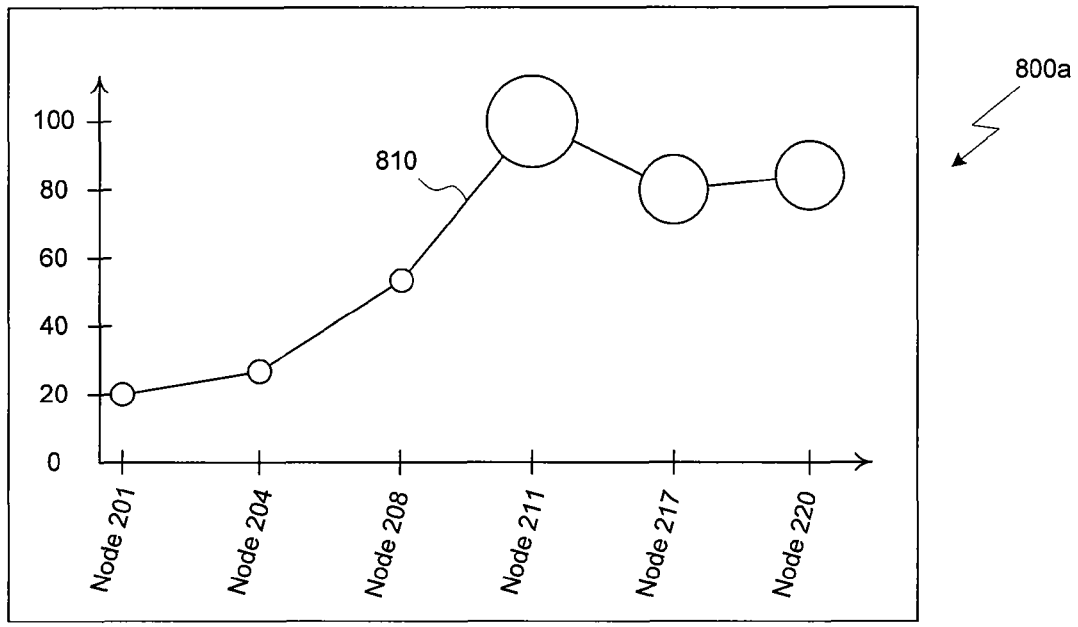
FIGS. 8A-8B illustrate a GUI object generated by a network management tool that is dynamically updated over time, according to one example embodiment of the present invention.
Figure 8B:
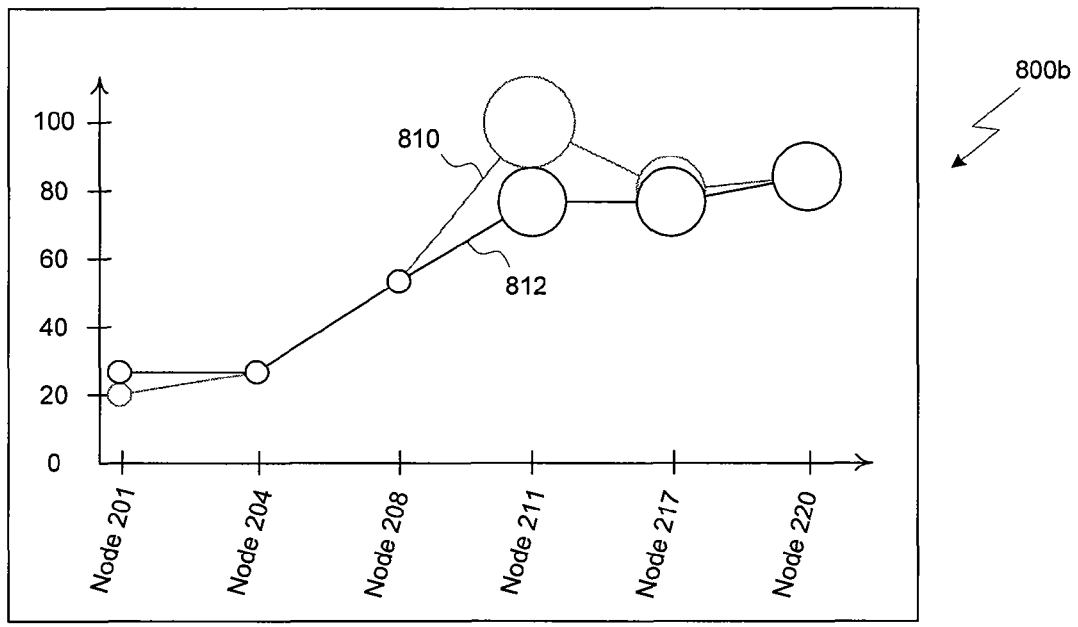

FIGS. 8A-8B illustrate a GUI object 800 generated by a network management tool 180 that is dynamically updated over time, according to one example embodiment of the present invention. As shown in FIG. 8A, GUI object 800a is similar to GUI object 300, described above. GUI object 800a includes a representation 810 of performance characteristic data that includes data points corresponding to the network nodes of network path 200. Performance characteristic representation 810 is a visual representation, such as a graph plotted on an x-axis and a y-axis, of performance characteristic data of the network nodes in network path 200 collected at a first time $t_0$. It will be appreciated by one of ordinary skill in the art that performance characteristic data may change over time. For example, while initially node 211 may experience a CPU utilization rate of 100%, after a short time, such as 30 seconds, network traffic arriving at network node 211 may subside and the CPU utilization rate may be reduced. Therefore, it is advantageous for a network administrator to be able to visualize changes in performance characteristic data over time to determine whether the data relates to a symptom caused by to spikes in network traffic or whether the symptom may be caused by a systemic issue such as the configuration of network 150.

GUI object 800a is shown with a performance characteristic representation 810 that reflects data for a first performance characteristic as well as either a characterization of the data or data for a second performance characteristic, as described in conjunction with GUI object 300. However, in one embodiment, performance characteristic representation 810 may reflect on a first performance characteristic. In such a case, the size of each of the data points in the representation of the performance characteristic data may be unrelated to any additional type of data.

In one embodiment of the invention as shown in FIG. 8B, the network management tool 180 may be configured to dynamically update GUI object 800a such that changes in performance characteristic data over time corresponding to the network nodes of network path 200 are displayed. GUI object 800b is an updated version of GUI object 800a corresponding to performance characteristic data collected at a second time $t_1$. GUI object 800b includes the same performance characteristic representation 810 of GUI object 800a as well as a new performance characteristic representation 812 corresponding to performance characteristic data collected at the second time $t_1$, subsequent to time $t_0$. Network management tool 180 may be configured to collect performance characteristic data from the network nodes of network path 200 periodically while GUI object 800 is displayed. For example, network management tool 180 may cause server computer 110 to transmit an RSVP message to client computer 120 every five seconds, thereby collecting updated performance characteristic data corresponding to the network nodes of network path 200 every five seconds. Network management tool 180 may then be configured to modify GUI object 800a to include a new representation corresponding to the updated performance characteristic data. In one embodiment, network management tool 180 is configured to superimpose performance characteristic representation 812 over performance characteristic representation 810 such that a network administrator can visualize changes or trends in the performance characteristic data over time.

As shown in FIG. 8B, network management tool 180 may modify GUI object 800b to indicate that one or more performance characteristic representations correspond to one or more previous times. For example, performance characteristic representation 810 corresponds to time $t_0$ and performance characteristic representation 812 corresponds to time $t_1$. In one embodiment, performance characteristic representations may be displayed partially transparent, with the relative amount of transparency based on the elapsed time since the performance characteristic data corresponding to the particular performance characteristic representation was collected. Performance characteristic representation 810 is modified to have a level of transparency set to 80% in GUI object 800b. In other embodiments, the color of the performance characteristic representation may be adjusted to reflect the elapsed time since the corresponding performance characteristic data was collected. As shown, GUI object 800b includes performance characteristic representations corresponding to two distinct times. It will be appreciated that performance characteristic representations for three or more times may be shown concurrently in GUI object 800b.

In another embodiment, network management tool 180 may be configured to determine an elapsed time between when performance characteristic data corresponding to a performance characteristic representation was collected and the current time. If network management tool 180 determines that the elapsed time is greater than an expiration time threshold value, then network management tool 180 may be configured to remove that particular performance characteristic representation from GUI object 800b. Consequently, GUI object 800b may only display performance characteristic representations corresponding to the most recent performance characteristic data collected. In this manner, GUI object 800b may be prevented from becoming overpopulated with performance characteristic representations that prevent easy interpretation of the performance characteristic data.

Figure 9A:
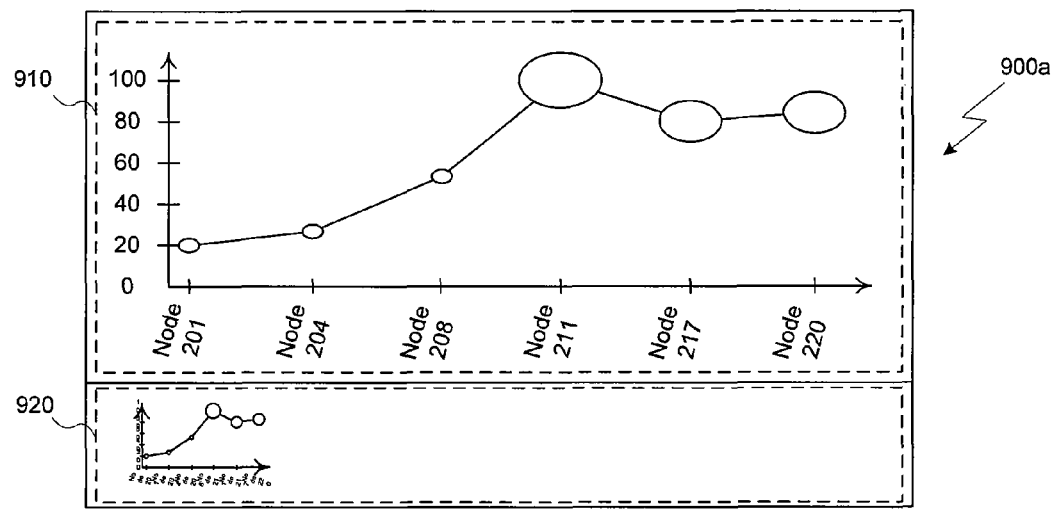
FIGS. 9A-9B illustrate a GUI object that includes a timeline generated by a network management tool, according to one example embodiment of the present invention.
Figure 9B:
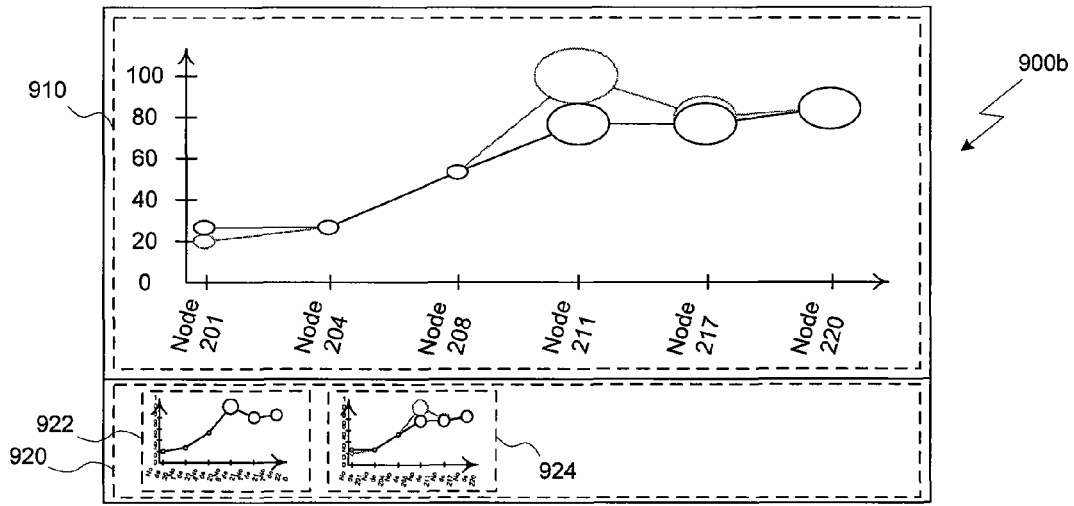

FIGS. 9A-9B illustrate a GUI object 900 that includes a timeline 920 generated by a network management tool 180, according to one example embodiment of the invention. As shown in FIG. 9A, GUI object 900a includes a display portion 910 and a timeline 920. The display portion 910 of GUI object 900a is similar to GUI object 800a, described above. In one embodiment, GUI object 900a includes a timeline 920 below the display portion 910. As time advances, one or more performance characteristic representations may fade away and no longer be included in the graphical representation of GUI object 900a. In such cases, a network administrator may want to refer back to previous states of the GUI object 900a in order to visualize performance characteristics related to a previous state of network path 200. Thus, GUI object 900a may include snapshots (i.e., a collection of image data included in at least a portion of GUI object 900a at a given point in time) of the display portion 910 of GUI object 900a for each set of performance characteristic data collected by network management tool 180. In alternative embodiments, timeline 920 may be displayed above or to the left or right of display portion 910. Alternatively, timeline 920 may be displayed as a distinct GUI object in addition to GUI object 900a.

In yet other embodiments, timeline 920 may display snapshots at different time intervals, configurable by the network administrator, unrelated to the time interval between successive attempts to collect performance characteristic data from the network nodes of network path 200. For example, network management tool 180 may be configured to collect network performance data every five seconds and configure GUI object 900a to include a separate performance characteristic representation associated with each set of collected network performance data. Consequently, the display portion 910 of GUI object 900a may be updated every five seconds. However, network management tool 180 may also be configured to take a snapshot of the display portion 910 every thirty seconds and add a thumbnail image associated with the snapshot to the timeline 920. Therefore, each distinct thumbnail image represents a snapshot of GUI object 900a every thirty seconds while, simultaneously, each performance characteristic representation in display portion 910 represents performance characteristic data collected every five seconds.

As shown in FIG. 9B, GUI object 900b includes a display portion 910 and a timeline 920. Display portion 910 of FIG. 9B includes two performance characteristic representations corresponding to two sets of performance characteristic data collected at different times. As shown, timeline 920 includes two thumbnail images 922, 924 of snapshots of display portion 910 of GUI object 900*b* at two distinct times. In one embodiment, timeline 920 may be configured to display up to a certain number of thumbnail images associated with different snapshots of GUI object 900. For example, timeline 920 may be configured to display five thumbnail images below display portion 910. The five thumbnail images may correspond to the most recent five snapshots captured by network management tool 180. In alternative embodiments, timeline 920 may be configured to display thumbnail images of each snapshot captured by network management tool 180 since the network management tool 180 initially generated GUI object 900*b*. For example, once network management tool 180 has captured more than five snapshots of display portion 910, timeline 920 may include a horizontal slide bar (not shown) such that a network administrator can select from more thumbnail images than are capable of being displayed simultaneously in GUI object 900*b*.

Advantageously, when one of the thumbnail images, such as thumbnail image 922, is selected, GUI object 900*b* may be modified to display the state of GUI object 900 at the time associated with thumbnail image 922. For example, the display portion 910 of GUI object 900*b* includes two performance characteristic representations associated with two corresponding sets of performance characteristic data collected at a first time and a second time, respectively. In contrast, the display portion 910 of GUI object 900*a* includes only one performance characteristic representation associated with the first set of performance characteristic data collected during the first time. Thumbnail image 922 reflects a snapshot of the display portion 910 of GUI object 900*a* at a first time and thumbnail image 924 reflects a snapshot of the display portion 910 of GUI object 900*b* at a second time. When a network administrator selects thumbnail image 922 in GUI object 900*b*, network management tool 180 may be configured to modify GUI object 900*b* to reflect the state of GUI object 900*a* at the first time.

In other embodiments, network management tool 180 may be configured to animate GUI object 900*b* over time. Network management tool 180 may include the ability to play back the snapshots of GUI object 900*b* in either direction (i.e., forward or backward) to help the network administrator visualize changes or trends in the performance characteristic data over time. For example, network management tool 180 may capture thirty (30) snapshots of GUI object 900*b* over the course of five minutes. Subsequently, the network management tool 180 may be used to generate an animation of the thirty captured snapshots, where each frame of the animation is an image of the GUI object 900*b* captured in one of the snapshots. Thus, a network administrator can view an animation of changing performance characteristic for the network nodes of network path 200 over time.

Figure 10:
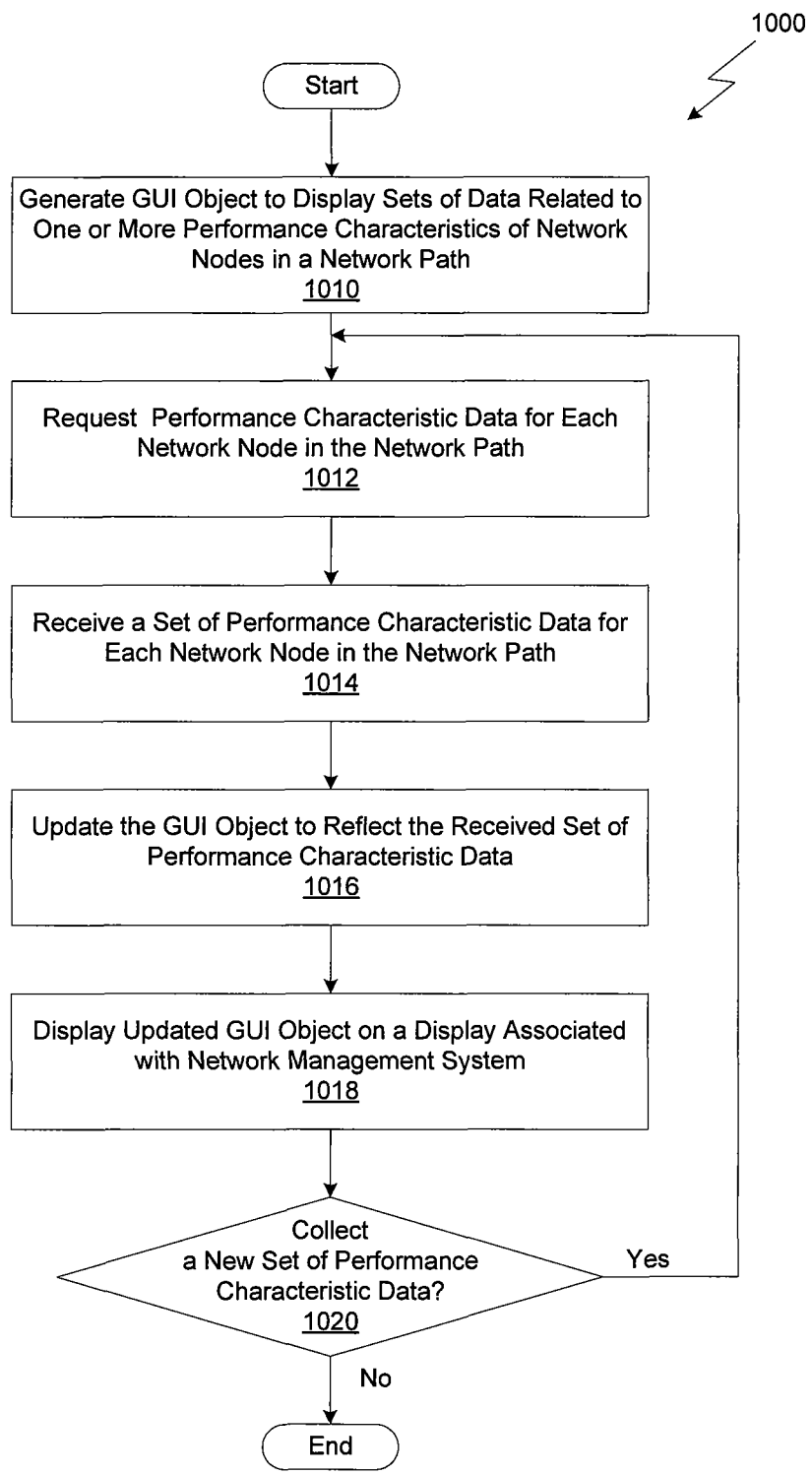
FIG. 10 is a flow diagram of method steps for displaying changes or trends in data related to one or more performance characteristics of the network nodes in a network path over time, according to one example embodiment of the present invention.

FIG. 10 is a flow diagram of method steps 1000 for displaying changes or trends in data related to one or more performance characteristics of the network nodes in a network path 200 over time, according to one example embodiment of the invention. Although the method steps are described in conjunction with the systems of FIGS. 1-6 and 8A-8B, persons skilled in the art will understand that any system configured to perform the method steps, in any order, is within the scope of the present invention.

The method 1000 begins at step 1010, where network management tool 180 is configured to generate a GUI object 800 to display sets of data related to one or more performance characteristics of network nodes in a network path. At step 1012, network management tool 180 is configured to request performance characteristic data from one or more network nodes in network path 200. In one embodiment, network management tool 180 causes server computer 110 to send a network control message, such as an RSVP message, to client computer 120 to request the performance characteristic data. At step 1014, network management tool 180 receives the performance characteristic data in the returned network control message. At step 1016, network management tool 180 updates the GUI object 800 to reflect the set of performance characteristic data received in step 1014. In one embodiment, network management tool 180 may increase the level of transparency of any performance characteristic representations previously included in GUI object 800 and superimpose a new representation of the performance characteristic data on top of GUI object 800. In another embodiment, network management tool 180 may include the new representation in a different color from any of the previously included representations of performance characteristic data. At step 1018, network management tool 180 causes the GUI object 800 to be displayed in a display associated with network management system 170.

At step 1020, network management tool 180 determines whether a new set of performance characteristic data should be collected. In one embodiment, network management tool 180 may be configured to collect a certain number of sets of performance characteristic data to be included in GUI object 800. For example, network management tool 180 may be configured to collect up to five sets of performance characteristic data and display a representation of each of the sets of performance characteristic data in GUI object 800. Once network management tool 180 collects five sets, subsequent updates of GUI object 800 are terminated. In another embodiment, network management tool 180 may be configured to continuously collect sets of performance characteristic data until a network administrator terminates subsequent updates, such as by closing the GUI object 800. In such continuous operation modes, GUI object 800 may be configured to only include performance characteristic representations related to the most recent sets of performance characteristic data. For example, GUI object 800 may only include up to five performance characteristic representations at any one time. If network management tool 180 determines that a new set of performance characteristic data should be collected, then method 1000 returns to step 1012, where network management tool 180 collects a new set of performance characteristic data and updates GUI object 800. However, if network management tool 180 determines that new sets of performance characteristic data should not be collected, then method 1000 terminates.

Figure 11A:
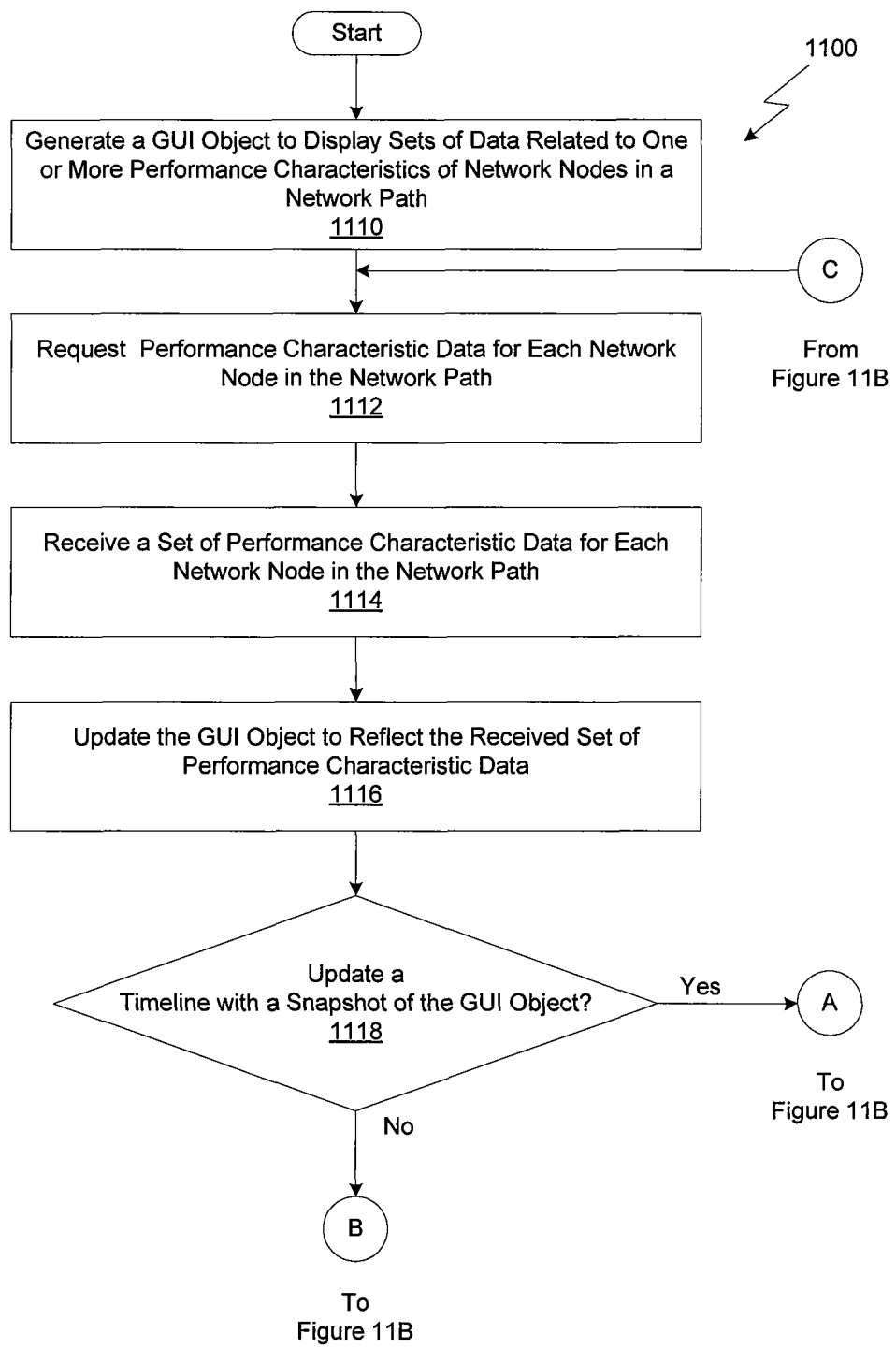
FIGS. 11A-11B are a flow diagram of method steps for displaying changes or trends in data related to one or more performance characteristics of the network nodes in a network path over time, according to one example embodiment of the invention.
Figure 11B:
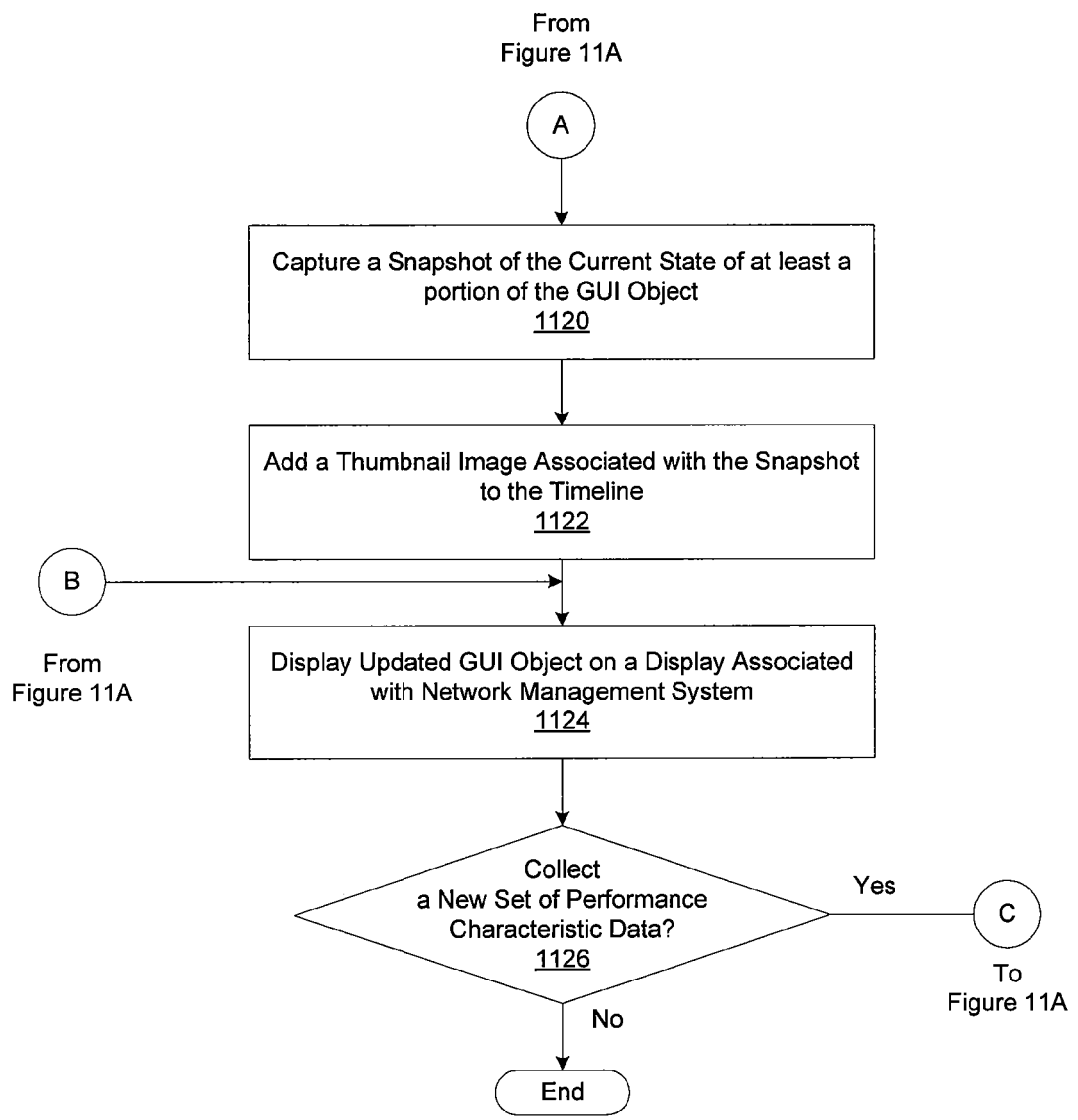

FIGS. 11A-11B are a flow diagram of method steps 1100 for displaying changes or trends in data related to one or more performance characteristics of the network nodes in a network path 200 over time, according to one example embodiment of the invention. Although the method steps are described in conjunction with the systems of FIGS. 1-6 and 9A-9B, persons skilled in the art will understand that any system configured to perform the method steps, in any order, is within the scope of the present invention.

The method 1100 begins at step 1110, where network management tool 180 is configured to generate a GUI object 900 to display sets of data related to one or more performance characteristics of network nodes in a network path. In one embodiment, GUI object 900 includes a timeline 920 for displaying snapshots of the current state of GUI object 900 at one or more previous times. In another embodiment, a separate GUI object is generated to display the timeline 920. At step 1112, network management tool 180 is configured to request performance characteristic data from one or more network nodes in network path 200. In one embodiment, network management tool 180 causes server computer 110 to send a network control message, such as an RSVP message, to client computer 120 to request the performance characteristic data. At step 1114, network management tool 180 receives the performance characteristic data in the returned network control message. At step 1116, network management tool 180 updates the GUI object 900 to reflect the set of performance characteristic data received in step 1114. In one embodiment, network management tool 180 may increase the level of transparency of any performance characteristic representations previously included in GUI object 900 and superimpose a new representation of the performance characteristic data on top of GUI object 900. In another embodiment, network management tool 180 may include the new representation in a different color from any of the previously included representations of performance characteristic data.

At step 1118, network management tool 180 determines whether a snapshot of the current state of GUI object 900 should be added to the timeline 920. If network management tool 180 determines that a snapshot should be added to the timeline 920, the method 1100 proceeds to step 1120 where network management tool 180 captures a snapshot of the current state of at least a portion of the GUI object 900. At step 1122, network management tool 180 may update the timeline 920 to include a thumbnail image 922 associated with the captured snapshot from step 1120. Then method 1100 proceeds to step 1124. Returning now to step 1118, if network management tool 180 determines that a snapshot should not be added to the timeline 920, then method 1100 proceeds to step 1124. At step 1124, network management tool 180 causes the GUI object 900 to be displayed in a display associated with network management system 170.

At step 1126, network management tool 180 determines whether a new set of performance characteristic data should be collected. In one embodiment, network management tool 180 may be configured to collect a certain number of sets of performance characteristic data to be included in GUI object 900. In another embodiment, network management tool 180 may be configured to continuously collect sets of performance characteristic data until a network administrator terminates subsequent updates, such as by closing the GUI object 900. If network management tool 180 determines that a new set of performance characteristic data should be collected, then method 1100 returns to step 1112, where network management tool 180 collects a new set of performance characteristic data and updates GUI object 900. However, if network management tool 180 determines that new sets of performance characteristic data should not be collected, then method 1100 terminates.

In sum, the technique described above allows a network administrator to visualize performance characteristics for a plurality of network nodes along a network path over time on a single view of the display. More specifically, a network management tool collects performance characteristic data from each of the network nodes in the network path between and including a server computer and a client computer. The network management tool then generates a GUI object, such as a graph, that displays two or more sets of data related to the performance characteristics. A first set of data is displayed via a first type of representation in the GUI object, such as a location in relation to a y-axis, and a second set of data is displayed via a second type of representation in the GUI object, such as the size or color of each data point. Additional sets of data may be displayed via additional distinguishable types of representation, such as the shape of each data point.

In addition, the network management tool may collect performance characteristic data from each of the network nodes in the network path repeatedly over time and update the GUI object to display the change or trend in performance characteristic data over time.

One advantage of the disclosed technique is that network administrators may visualize dynamically updated performance characteristic data for a plurality of network nodes in a network path in the same graphical object being displayed. In prior art systems, a network administrator may be required to select a particular node in a topology view of the network in order to view the performance characteristics for the network node. Such systems did not allow a network administrator to view the performance characteristic data for all network nodes of a network path on a single display. In addition, the technique also allows a network administrator to view changes and trends in the performance characteristic data over time. Such advantages allow a network administrator to more quickly diagnose and correct issues with the network.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method comprising:
generating an object within a graphical user interface (GUI) to display first data associated with at least one performance characteristic via a first representation within the object, wherein the at least one performance characteristic is related to one or more network nodes in a network path, wherein the first data is received at a first time;
updating the object to display second data associated with the at least one performance characteristic via a second representation within the object, wherein the second data is received at a second time that is subsequent to the first time; and
updating the object to display third data associated with the at least one performance characteristic via a third representation within the object by:
removing the first representation from the object;
adjusting a level of transparency of the second representation; and
superimposing the third representation on top of the second representation within the object, wherein the third data is received at a third time that is subsequent to the first time and to the second time.

2. The method of claim 1, wherein the object comprises a graph having an x-axis and a y-axis, the x-axis being associated with at least one of the network nodes, and the y-axis being associated with a first performance characteristic of the at least one performance characteristic.

3. The method of claim 1, wherein the step of updating the object to display the second data comprises:
adjusting a level of transparency associated with the first representation; and
superimposing the second representation on top of the first representation within the object.

4. The method of claim 1, wherein the object includes a timeline configured to display one or more thumbnail images, each thumbnail image corresponding to a state of the object at a previous point in time.

5. The method of claim 4, further comprising:
generating a first thumbnail image of at least a portion of the object at the first time; and
updating the timeline to include the first thumbnail image.

6. The method of claim 5, further comprising:
at a subsequent time, selecting the first thumbnail image in the timeline; and
modifying the object to reflect the state of the object corresponding to the first thumbnail image.

7. A system comprising:
a network that includes at least one network node;
a server computer;
a client computer coupled to the server computer via a network path; and
a network management system coupled to the server computer and configured to:
generate an object within a graphical user interface (GUI) to display first data associated with at least one performance characteristic via a first representation within the object, wherein the at least one performance characteristic is related to one or more network nodes in a network path, wherein the first data is received at a first time;
update the object to display second data associated with the at least one performance characteristic via a second representation within the object, wherein the second data is received at a second time that is subsequent to the first time; and
update the object to display third data associated with the at least one performance characteristic via a third representation within the object by:
removing the first representation from the object;
adjusting a level of transparency of the second representation; and
superimposing the third representation on top of the second representation within the object,
wherein the third data is received at a third time that is subsequent to the first time and to the second time.

8. The system of claim 7, wherein the object comprises a graph having an x-axis and a y-axis, the x-axis being associated with at least one of the network nodes, and the y-axis being associated with a first performance characteristic of the at least one performance characteristic.

9. The system of claim 7, wherein the step of updating the object to display the second data comprises:
adjusting a level of transparency associated with the first representation; and
superimposing the second representation on top of the first representation within the object.

10. The system of claim 7, wherein the object includes a timeline configured to display one or more thumbnail images corresponding to a state of the object at one or more previous times.

11. The system of claim 10, wherein the network management system is further configured to:
generate a first thumbnail image of at least a portion of the object at the first time; and
update the timeline to include the first thumbnail image.

12. The system of claim 11, wherein the network management system is further configured to:
at a subsequent time, select the first thumbnail image in the timeline; and
modify the object to reflect the state of the object corresponding to the first thumbnail image.

13. A non-transitory computer-readable medium including instructions that, when executed by a processor, perform the steps of:
generating an object within a graphical user interface (GUI) to display first data associated with at least one performance characteristic via a first representation within the object, wherein the at least one performance characteristic is related to one or more network nodes in a network path, wherein the first data is received at a first time; and
updating the object to display second data associated with the at least one performance characteristic via a second representation within the object by:
adjusting a level of transparency of the first representation;
superimposing the second representation on top of the first representation within the object; and
upon determining that an elapsed time between the first time and a current time exceeds an expiration threshold, removing the first representation from the object,
wherein the second data is received at a second time that is subsequent to the first time.

14. The non-transitory computer-readable medium of claim 13, further comprising updating the object to display third data associated with the at least one performance characteristic via a third representation within the object, wherein the third data is received at a third time that is subsequent to the first time and to the second time, wherein updating the object to display the third data comprises:
adjusting a level of transparency associated with the second representation; and
superimposing the third representation on top of the second representation within the object.

15. The non-transitory computer-readable medium of claim 13, further comprising:
generating a first thumbnail image of at least a portion of the object at the first time; and
updating a timeline to include the first thumbnail image.

* * * * *